June 24, 1947.  C. OLSTAD  2,423,043
CLUTCH CONTROL
Filed Sept. 14, 1945  2 Sheets-Sheet 1
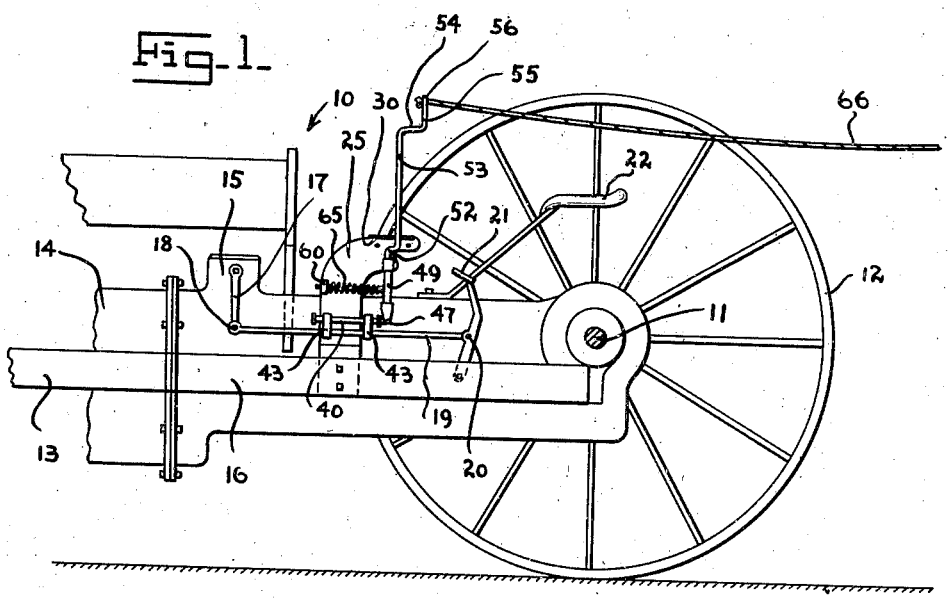
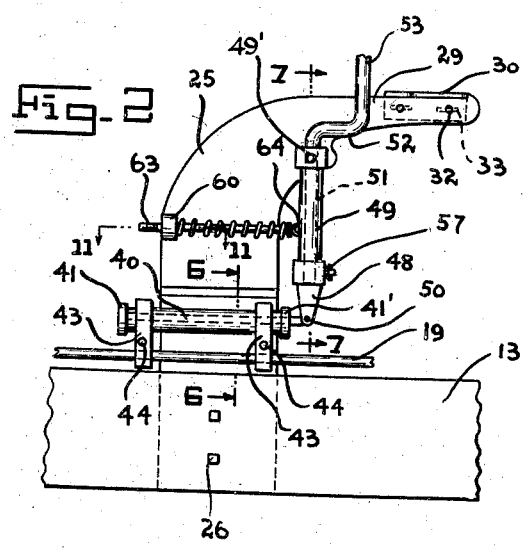
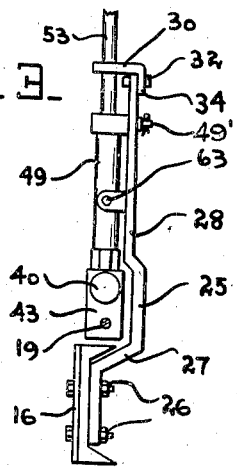
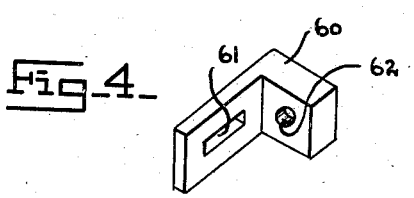
Inventor
CALMER OLSTAD
By *Clarence A. O'Brien and Harvey B. Jacobson*
Attorneys

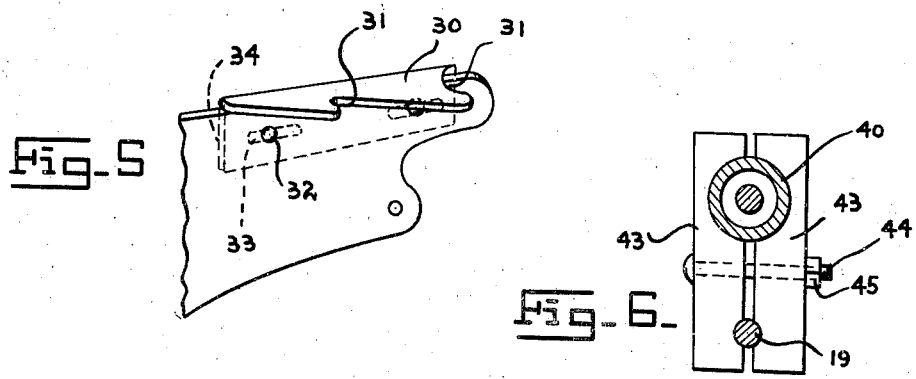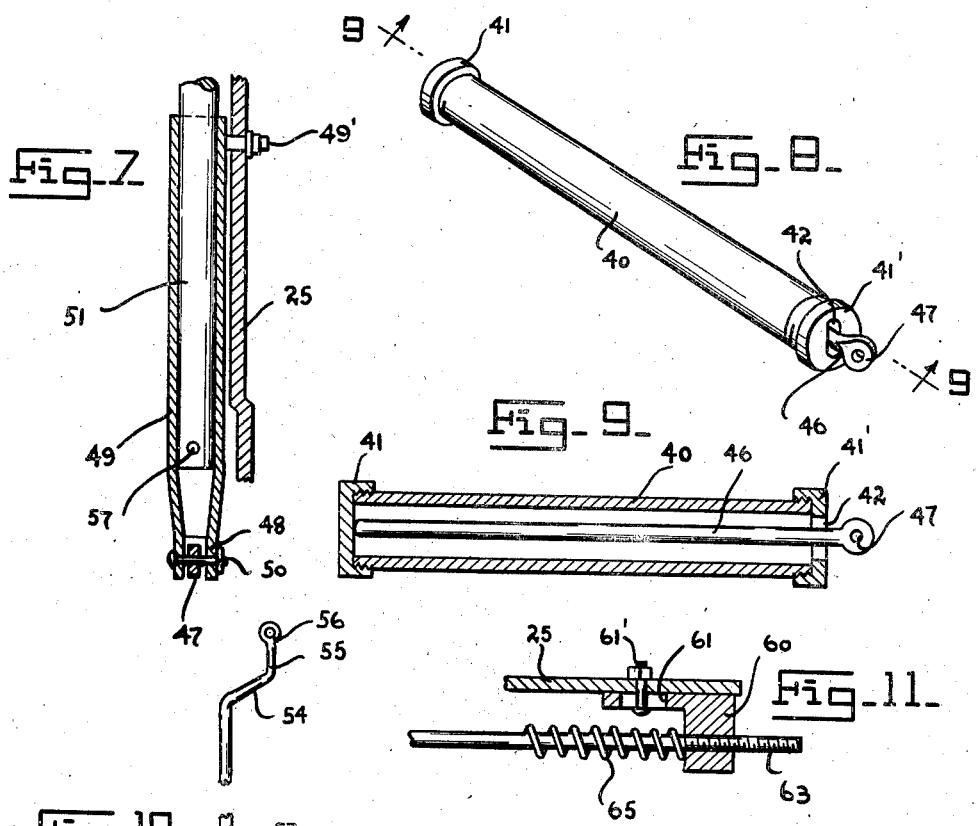

Patented June 24, 1947

2,423,043

UNITED STATES PATENT OFFICE 2,423,043

CLUTCH CONTROL

Calmer Olstad, Nerstrand, Minn.

Application September 14, 1945, Serial No. 616,235

4 Claims. (Cl. 74—481)

This invention relates to a clutch control, and more particularly to such a control for tractors or similar vehicles.

A primary object of the invention is to control the clutch of a tractor or similar vehicle by either hand or foot pressure, and, if desired, from a point remote from the normal driver's seat of the vehicle.

Among its features, my invention embodies a detachable hand lever adapted to be secured to the normal clutch control rod of a power-driven vehicle such as a tractor, provided with means whereby the lever may be latched in a desired position to maintain the clutch in either operative or inoperative position, as may be desired.

A further feature of the invention resides in the provision of improved means for securing the hand lever to the control rod of the clutch in such manner that the control rod may be moved either by the hand lever or by the normal foot pedal, as may be desired.

Other objects and features of the invention will in part be obvious and in part be pointed out as the description of the invention proceeds and shown in the accompanying drawings, wherein there is disclosed a preferred embodiment of this inventive concept.

In the drawings:

Figure 1 is a fragmentary side view, partially in section and partially in elevation of a tractor frame showing the attachment of the instant invention as applied thereto, Figure 2 is an enlarged side elevational view of a detail of the control mechanism, Figure 3 is an end elevational view of the structure disclosed in Figure 2, as viewed from the left, Figure 4 is a perspective view of the constructional detail, Figure 5 is a fragmentary perspective view of a further constructional detail, Figure 6 is an enlarged sectional view taken substantially along the line 6—6 of Figure 2, as viewed in the direction indicated by the arrows, Figure 7 is an enlarged sectional view taken substantially along the line 7—7 of Figure 2, as viewed in the direction indicated by the arrows, Figure 8 is an enlarged perspective view of a further constructional detail, Figure 9 is a sectional view taken substantially along the line 9—9 of Figure 8, as viewed in the direction indicated by the arrows, Figure 10 is an enlarged perspective view, partially broken away, of the control lever for the device, and Figure 11 is an enlarged sectional view taken substantially along the line 11—11 of Figure 2, as viewed in the direction indicated by the arrows.

Similar reference characters refer to similar parts throughout the several views of the drawings.

Having reference now to the drawings, there is generally indicated at 10 a tractor of any desired conventional type including a rear axle 11 adapted to drive power wheels 12, and including a frame 13 supporting a conventional motor 14 provided with a clutch 15. The frame 13 includes longitudinally extending channel-shaped side rods 16.

The clutch mechanism 15 is provided with an operating lever 17, to which is secured pivotally, as at 18, a clutch control rod 19, having its opposite end pivotally secured, as at 20, to a foot-operated clutch pedal 21 positioned adjacent the conventional driver's seat 22.

The attachment of the instant invention includes a bracket 25 secured, as by bolt and nut 26, to one of the side frames 16 adjacent the clutch control rod 19. As best shown in Figure 3, the bracket 25 is provided with an offset portion 27 and an upwardly extending portion 28, terminating in an extending portion 29 substantially parallel to the frame members 16, and at right angles to the upright portion 28. Secured to the extremity of the portion 29 is a plate 30, provided with lever-engaging notches 31, the purpose of which will be more fully described hereinafter. As best shown in Figure 5, the attaching means may take the form of bolts 32 passed through elongated slots 33 in a depending flange 34 comprising a portion of the plate 30, this to permit relative adjustment of the position of the notches, for a purpose to be more fully described hereinafter.

A sleeve 40 provided with end caps 41, one of which, 41', is provided with a slotted aperture 42, is adapted to be clamped to the control rod 19, by means of clamping brackets 43 provided with semi-cylindrical aligned recesses therein adapted to surround the control rod 19 and the sleeve 40, as best shown in Figure 6, the opposite plates 43 being secured together, as by means of bolts 44 and nuts 45. It will now be seen that the connection between the cylinder 40 and the control rod 19 is relatively fixed, and that consequently movement imparted to the cylinder 40 will in turn be transmitted to the control rod 19 for the actuation of the lever 17 and hence the clutch 15.

Extending within the sleeve 40 is a slidable rod 46, extending outwardly through the aperture 42 and terminating in an eye 47, the opposite end of the member 46 being adapted to abut the inner portion of the end cap 41.

As best shown in Figure 7, the eye 47 is adapted to be positioned between the bifurcations 48 forming the extremity of a sleeve 49 pivotally secured as at 49' to member 25, and secured in position as by a pin 50 passing through suitable aligned apertures in the bifurcations 48 and the eye 47.

The sleeve 49 is adapted to contain one end 51 of a hand lever, including an offset portion 52 and an upright portion 53 and terminating in a second offset portion 54, an upright portion 55, and finally an eye 56. A cotter pin 57 passes through suitable apertures in the lower extremity of the sleeve 49 and a registering aperture 58 in the lower extremity of the portion 51 serves to hold the lever in related assembly with the sleeve. It will now be seen that with the parts properly assembled, the upright portion 53 extends upwardly adjacent the plate 30, and is adapted, when moved rearwardly, to engage in a selected one of the notches 31, securing the same in retracted position.

Secured to the bracket 25 is a lug 60, of generally L-shaped configuration, provided with an elongated slot 61 through which a bolt 61' or the like may be passed for securing the same to the bracket, and in its other leg with a threaded aperture 62 adapted to engage the extremity of a threaded bolt 63. The opposite end of the bolt 63 is pivotally secured, as at 64, to the sleeve 49, and the portion of the bolt between the lug 60 and the sleeve 49 is surrounded by a compression spring 65.

If desired, a rope 66 may be secured to the eye 56 and extend to any desired remote location, as, for example, the operating seat of a farm implement towed by the tractor.

From the foregoing, the operation of the device should now be readily understandable. When the hand lever 53 is pulled back, either manually or by means of the rope 66, the rod 46 is moved forwardly against the end cap 41 of the sleeve 40, which movement, through the clamping members 43, is transmitted to the clutch control rod 19, and in turn to the clutch 15. The spring 65 serves normally to bias the sleeve 49, and hence the control rod 53 to upright position. However, when the portion 53 of the hand lever is engaged in one of the notches 31, the hand lever, and correspondingly the clutch control rod 19, will be retained in advanced position, and remain so until the control rod is released from its associated notch. This can obviously be accomplished by moving the control rod laterally either by hand or by means of the rope 66.

From the foregoing, it will now be seen that there is herein provided a device accomplishing all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a control device of the character described, a frame, a control rod, a sleeve having an end cap secured to said control rod, an actuating rod in said sleeve adapted to abut said end cap, a lever pivotally secured to said actuating rod, a bracket secured to said frame, spring means between said bracket and said lever, and latch means for said lever carried by said bracket.

2. In a control device of the character described, a frame, a control rod, a sleeve having an end cap secured to said control rod, an actuating rod in said sleeve adapted to abut said end cap, a lever pivotally secured to said actuating rod, a bracket secured to said frame, spring means between said bracket and said lever, said spring means including a lug secured to said bracket, a bolt engaging said lug and pivotally secured to said lever, and a compression spring about said bolt between said lug and said lever, and latch means for said lever carried by said bracket.

3. In a control device of the character described, a frame, a control rod, a sleeve having an end cap secured to said control rod, an actuating rod in said sleeve adapted to abut said end cap, a lever pivotally secured to said actuating rod, a bracket secured to said frame, spring means between said bracket and said lever, said spring means including a lug secured to said bracket, a compression spring about said bolt between said lug and said lever, and latch means for said lever carried by said bracket, said latch means including a plate having notches therein secured to said bracket.

4. In a control device of the character described, a frame, a control rod, a sleeve having an end cap secured to said control rod, an actuating rod in said sleeve adapted to abut said end cap, a lever pivotally secured to said actuating rod, a bracket secured to said frame, spring means between said bracket and said lever, said spring means including a lug secured to said bracket, a compression spring about said bolt between said lug and said lever, latch means for said lever carried by said bracket, said latch means including a plate having notches therein secured to said bracket, and means for controlling the movement of said lever from a remote point.

CALMER OLSTAD.

REFERENCES CITED

The following references are of record in the file of this patent:

UNITED STATES PATENTS

| Number | Name | Date |
|---|---|---|
| 1,234,344 | Josephson | July 24, 1917 |
| 1,359,385 | Johnson | Nov. 16, 1920 |
| 1,475,727 | Stroh | Nov. 27, 1923 |
| 1,514,838 | De May | Nov. 11, 1924 |
| 1,801,987 | Strand | Apr. 21, 1931 |